(12) United States Patent
Swanger

(10) Patent No.: US 6,279,860 B1
(45) Date of Patent: Aug. 28, 2001

(54) HEAT EXCHANGER HOUSING SUPPORT

(76) Inventor: Brett A. Swanger, 1008 E. New Boston Rd., Nash, TX (US) 75569

( * ) Notice: Subject to any disclaimer, the term of this patent is extended or adjusted under 35 U.S.C. 154(b) by 0 days.

(21) Appl. No.: 09/528,517

(22) Filed: Mar. 20, 2000

Related U.S. Application Data

(60) Provisional application No. 60/152,568, filed on Sep. 7, 1999.

(51) Int. Cl.$^7$ ............................................. F16M 11/28
(52) U.S. Cl. .................................... 248/125.2; 248/354.3; 248/405
(58) Field of Search ..................... 248/125.1, 125.2, 248/125.8, 161, 354.4, 357, 405, 415, 416, 422, 669, 676, 188.2, 188.4, 188.5, 354.3, 404, 406.1, 406.2

(56) References Cited

U.S. PATENT DOCUMENTS

| | | | | |
|---|---|---|---|---|
| 1,073,294 | * | 9/1913 | Siewert | 254/103 |
| 2,176,536 | * | 10/1939 | McCauley | 431/290 |
| 2,339,081 | * | 1/1944 | Karp | 248/125.2 |
| 2,512,068 | * | 6/1950 | Mayo | 33/10 |
| 3,158,269 | | 11/1964 | Corso | 214/1 |
| 3,329,402 | * | 7/1967 | Grumman | 254/420 |
| 3,714,833 | * | 2/1973 | Newman | 73/865.6 |
| 4,488,497 | | 12/1984 | Bevans | 108/144 |
| 5,116,004 | | 5/1992 | Luecke | 248/161 |
| 5,181,681 | | 1/1993 | Edwards | 248/125 |
| 5,330,143 | | 7/1994 | Rich | 248/161 |
| 5,374,019 | | 12/1994 | Fischer | 248/122 |
| 5,692,719 | | 12/1997 | Shepherd | 248/460 |
| 5,873,312 | | 2/1999 | Mauro-Vetter . | |
| 6,131,870 | * | 10/2000 | Tseng | 248/406.1 |

* cited by examiner

*Primary Examiner*—Ramon O. Ramirez
*Assistant Examiner*—Jon A Szumny
(74) *Attorney, Agent, or Firm*—John M. Harrison

(57) ABSTRACT

A heat exchanger housing support for supporting a heat exchanger or coil housing and accompanying ductwork in the installation of heating and air conditioning equipment. The heat exchanger housing supports are typically used in pairs and are each characterized by a vertically-oriented support leg having a longitudinal leg cavity for receiving a threaded rod, with an adjusting nut provided on the threaded rod and a bevel gear provided on the adjusting nut. A second bevel gear is mounted on the support leg for meshing with the first bevel gear on the adjusting nut and driving the threaded rod up and down. A bottom bracket is attached to the bottom end of the support leg for resting on a supporting surface and a top bracket is fitted to a top nut threaded on the upper end of the threaded rod for engagement with the heat exchanger or coil housing. Raising and lowering of the respective top brackets and the heat exchanger or coil housing using oppositely-disposed, spaced-apart heat exchanger housing supports is accomplished by manipulating the second bevel gear to drive the first bevel gear, rotate the adjusting nut on each of the two threaded rods and raise and lower the top bracket mounted on the threaded rods extending into the respective support legs.

20 Claims, 3 Drawing Sheets

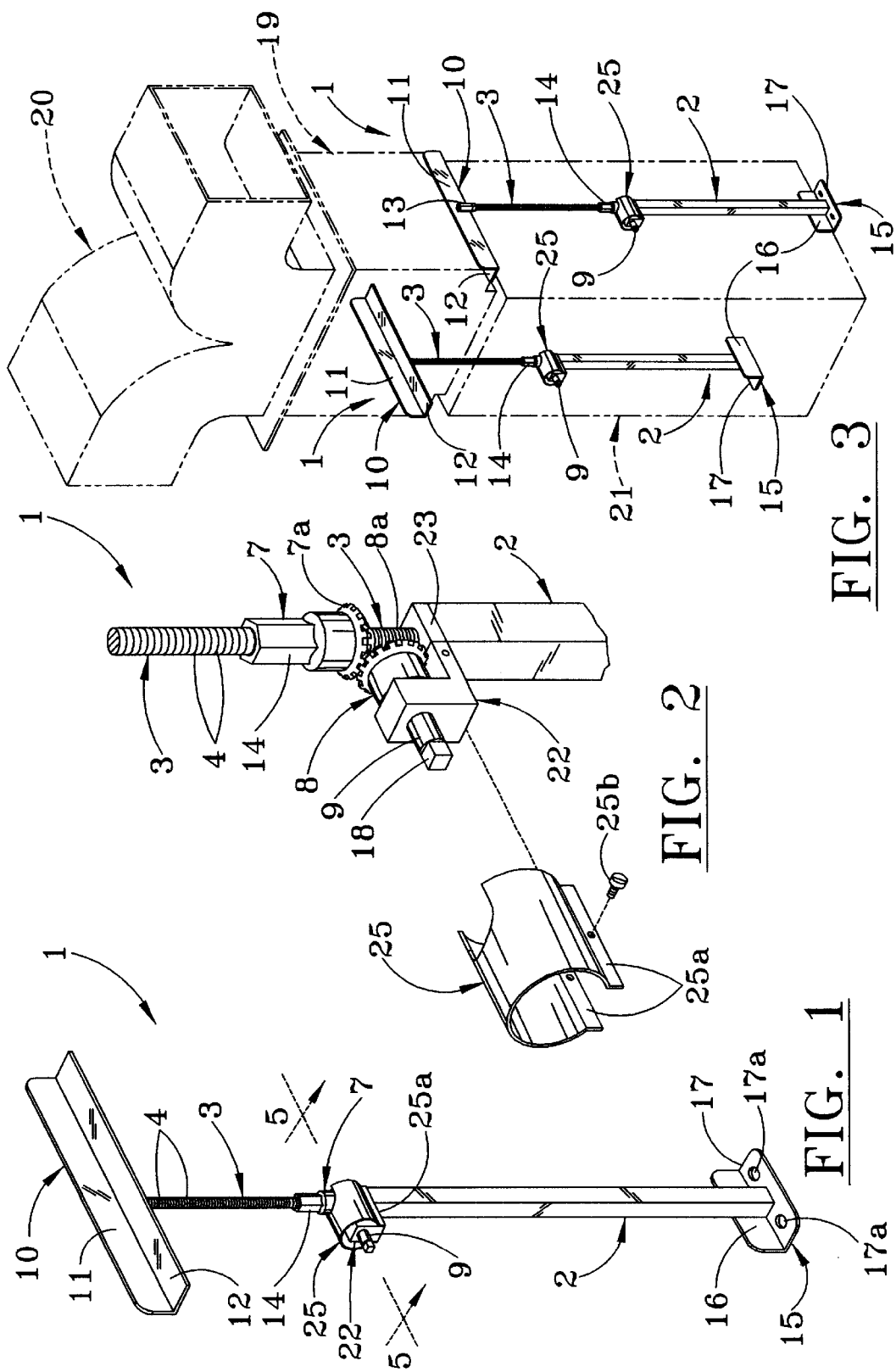

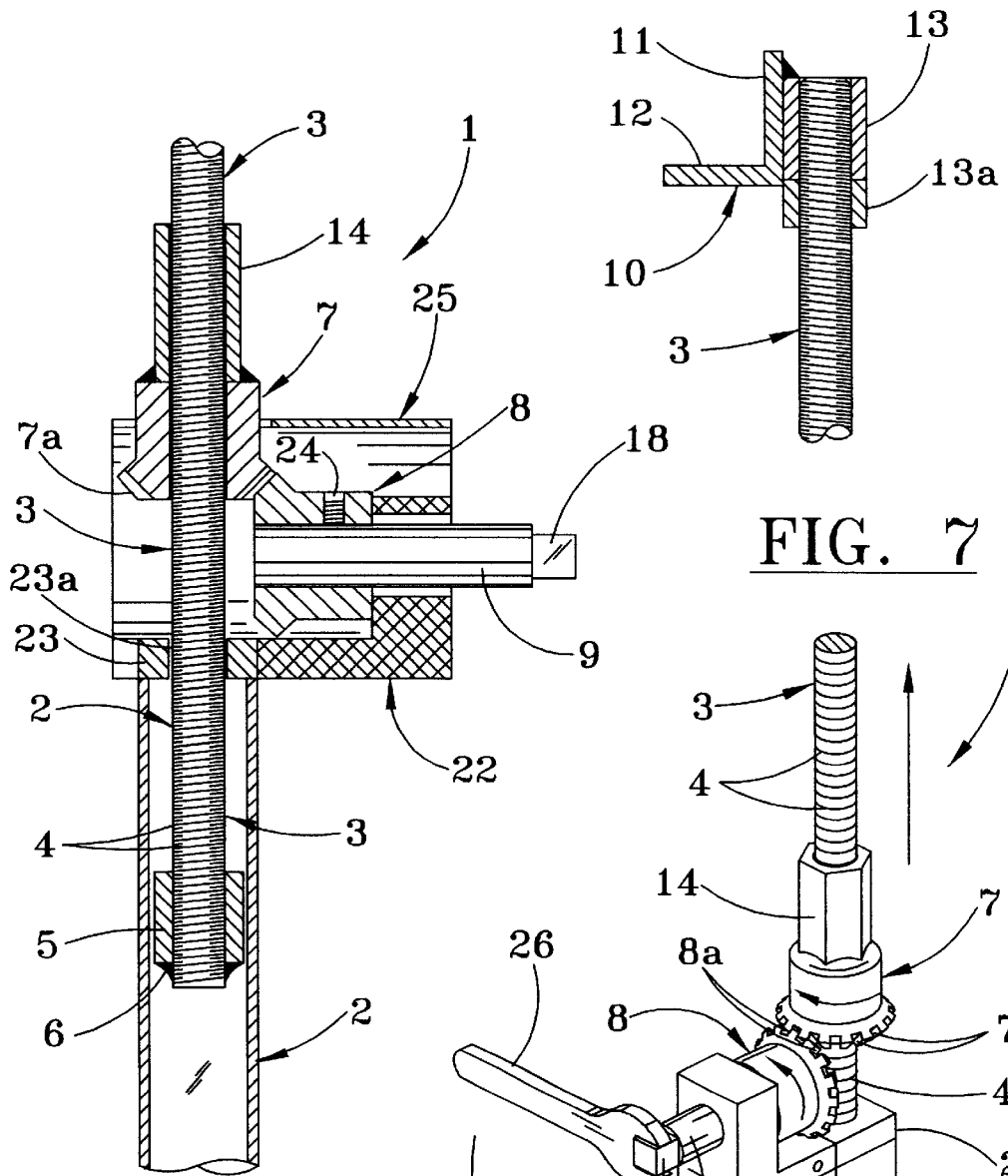
FIG. 5
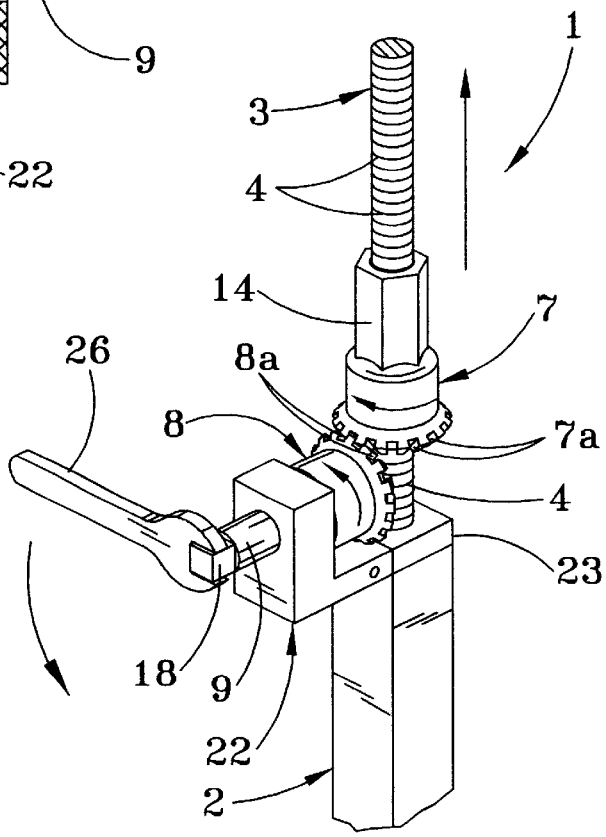
FIG. 7
FIG. 6

HEAT EXCHANGER HOUSING SUPPORT

CROSS-REFERENCE TO RELATED APPLICATIONS

This application claims the benefit of copending U.S. Provisional Application Ser. No. 60/152,568, filed Sep. 7, 1999.

BACKGROUND OF THE INVENTION

1. Field of the Invention

This invention relates to the installation and maintenance of heating and air conditioning equipment and more particularly, to a heat exchanger housing support which is designed to operate in pairs, primarily to support the heat exchanger or coil element of a heating and air conditioning system. The heat exchanger housing support is typically characterized by a vertical support leg having a longitudinal leg cavity or bore for receiving a threaded rod, which rod also threadably engages an adjusting nut typically attached to a bevel gear, which engages a second bevel gear on the top end of the support leg. A bottom bracket or support is fitted on the bottom end of the support leg for stabilizing the support leg on a supporting surface and a top engaging element or bracket is typically attached to a top nut threaded on the top end of the threaded rod for engaging the heat exchanger housing. Raising and lowering of the heat exchanger housing using a pair of heat exchanger housing supports positioned in oppositely-disposed, spaced-apart configuration, is effected by manipulation of the second bevel gear and driving the first bevel gear to rotate each adjusting nut on the corresponding threaded rod and raise and lower the respective threaded rods and the oppositely-disposed top brackets, as well as the heat exchanger housing itself. In a preferred embodiment a spacer is welded or otherwise attached to the bottom end of the threaded rod that fits inside the leg cavity of the respective support legs to stabilize the threaded rod for vertical movement only in the support legs and on the adjusting nuts and prevent the threaded rod from extraction from the support legs.

2. Description of the Prior Art

One of the problems which exists in the installation, repair and replacement of heating and air conditioning units is that of safely and effectively handling the coil element or heat exchanger unit or housing due to the weight of this equipment. The equipment is typically heavy and moved by hand, and the maintenance or replacement operation frequently results in injuries. Accordingly, there exists a need for a mechanical device for engaging the heat exchanger unit and incrementally and smoothly raising and lowering the unit during maintenance and replacement operations.

Many devices are known in the art for supporting, raising and lowering various equipment. U.S. Pat. No. 3,158,269, dated Nov. 24, 1964, to Corso, details a "Generator Remover Apparatus" which includes a frame having leg members, rollers on the lower ends of the leg members, a horizontally-extending support member connected to the upper ends of the two leg members, a box-like structure disposed on the support member and a generator support mounted on the box structure and vertically movable with respect to the structure. The raising and lowering apparatus is attached to the structure for raising and lowering the generator. U.S. Pat. No. 4,488,497, dated Dec. 18, 1984, to Bevans, details an adjustable tool tray having a support, wheel-mounted legs attached to the bottom end of the support and a tray vertically adjustable on the support for raising and lowering various tools located on the tray. U.S. Pat. No. 5,116,004, dated May 26, 1992, to Luecke, details a vertically-adjustable mounting post for an optical element. The device includes a base plate and a support plate, joined by an axially-adjustable linking mechanism. The linking mechanism includes a first threaded shaft attached to the base plate and a second threaded shaft attached to the support plate, wherein the two shafts are hollow and can engage each other telescopically. A coupling member engages the outside of the shaft to facilitate rotation of the coupling member and axial translation of the shafts relative to each other. U.S. Pat. No. 5,181,681, dated Jan. 26, 1993, to Edwards, details an "Adjustable Stand Apparatus". The apparatus includes a platform for holding tools, which platform is vertically-mounted on a support attached to a mobile base. U.S. Pat. No. 5,330,143, dated Jul. 19, 1994, to Rich, et al, details a craft stand having a support upward-standing from a base and fitted with a universal joint assembly on the upper end thereof. A cross-arm is attached to the universal joint assembly and clamp assemblies are attached to each end of the cross-arm for clamping workstock. U.S. Pat. No. 5,374,019, dated Dec. 20, 1994, to Fischer, details a "Multi-Positionable Collapsible Tool Bench". The bench includes a base, a stand upward-standing from the base and a pair of trays extending from the top end of the stand for receiving tools. U.S. Pat. No. 5,692,719, dated Dec. 2, 1997, to Shepherd, details a "Sheet Music Stand" having a vertically-oriented support extending from a base and fitted with an L-shaped music support at the top end thereof. U.S. Pat. No. 5,873,312, dated Feb. 23, 1999, to Mauro-Vetter details an "Adjustable Parts Holder", which includes a tray and a vertically-extensible and retractable support for supporting a tray. A brace in the shape of a footrest is secured to the support beneath the tray in a selected vertically-adjusted position independently of the tray. It is an object of this invention to provide a heat exchanger housing support for lifting and adjusting such heavy objects as a heat exchanger or coil housing in heating and air conditioning equipment.

Another object of the invention is to provide new and improved heat exchanger housing supports typically used in pairs to raise and lower heat exchangers or coil units and other heavy items, typically in heating and air conditioning equipment, for installation and maintenance purposes.

Still another object of this invention is to provide a new and improved heat exchanger, coil housing, or alternative equipment support normally used in pairs, each support of which is characterized by a support leg having a longitudinal bore or cavity and fitted with a side bevel gear and a bottom bracket or support for stabilizing the support leg on a supporting surface in upward-standing configuration. A threaded rod projects into the top end of the bore or cavity of the support leg and is vertically adjusted therein by means of a top bevel gear meshed with the side bevel gear and attached to an adjusting nut threaded on the threaded rod. A top engaging element or bracket is attached to the upper end of the threaded rod for engaging the heat exchanger or coil housing. Adjustment of the heat exchanger or coil housing upwardly and downwardly is effected by manipulation of the side bevel gear to drive the top bevel gear and rotate each adjusting nut on the corresponding threaded rod to raise and lower the top bracket and threaded rod in each of the supports.

Still another object of this invention is to provide a heat exchanger housing support fitted with an upward-standing, typically vertical support leg, preferably having a square cross-section and a bottom bracket attached to the bottom end of the support leg for stabilizing the support leg on a supporting surface in upward-standing configuration. A side bevel gear bracket is mounted on the support leg, a side bevel gear is mounted for rotation on the side bevel gear bracket, and a threaded rod extends through a bracket mount and threadably receives an adjusting nut, to which is attached a top bevel gear that meshes with the side bevel gear. The threaded rod extends into the top end of the support leg and a top bracket, typically having a top nut receiving the top end of the threaded rod, has vertical and horizontal flange elements for engaging the heat exchanger or coil housing. The supports are typically used in oppositely-disposed pairs to raise and lower the heat exchanger or coil housing for installation or maintenance purposes by manipulating the respective side bevel gears, driving the top bevel gears and the respective adjusting nuts threaded on the corresponding threaded rods and raising and lowering the threaded rods.

SUMMARY OF THE INVENTION

These and other objects of the invention are provided in a heat exchanger housing support normally used in spaced-apart pairs for supporting a heat exchanger housing in the installation and maintenance of heating and air conditioning units. Each heat exchanger housing support is typically characterized by an elongated support leg having a square cross-section and fitted at the top end with a bracket that mounts a rotatable side bevel gear and at the bottom end with an L-shaped bottom bracket for engaging a supporting surface. At the top end of each support leg a threaded rod extends inside the support leg and typically includes a spacer having a square cross-section for insertion in the support leg, threading on the rod and stabilizing the threaded rod for vertical movement only, and preventing removal of the threaded rod from inside the support leg. An adjusting nut is threaded on each of the threaded rods and a top bevel gear is welded or otherwise attached to each adjusting nut and meshes with the side bevel gear, for raising and lowering the threaded rod with respect to the support leg by rotation of the respective side bevel gear. A top bracket typically has a vertical flange and a horizontal flange, with a top nut attached to the vertical flange for threadably receiving the top end of the threaded rod, wherein the horizontal flange of each top bracket in each support engages the heat exchanger housing on either side thereof and facilitates raising and lowering of the heat exchanger housing by manipulation of the respective side bevel gears and the adjusting nuts on the corresponding threaded rods to raise and lower the top brackets and threaded rods.

BRIEF DESCRIPTION OF THE DRAWINGS

The invention will be better understood by reference to the accompanying drawings, wherein:

FIG. 1 is a perspective view of a preferred embodiment of the heat exchanger housing support of this invention;

FIG. 2 is an exploded view of the bevel gear and housing components of the heat exchanger housing support illustrated in FIG. 1;

FIG. 3 is a perspective view of a pair of heat exchanger housing supports positioned in functional, spaced-apart orientation supporting a heat exchanger housing, illustrated in phantom;

FIG. 5 is a sectional view of the bevel gear elements of the heat exchanger housing support illustrated in FIG. 2;

FIG. 6 is a perspective view of the bevel gear elements illustrated in FIG. 5, more particularly illustrating a wrench applied to the side bevel gear shaft; and FIG. 7 is a sectional view, taken along line 7—7 of the top bracket, top nut and jam nut elements of the heat exchanger housing support illustrated in FIG. 4.

DESCRIPTION OF THE PREFERRED EMBODIMENTS

Figure 4:
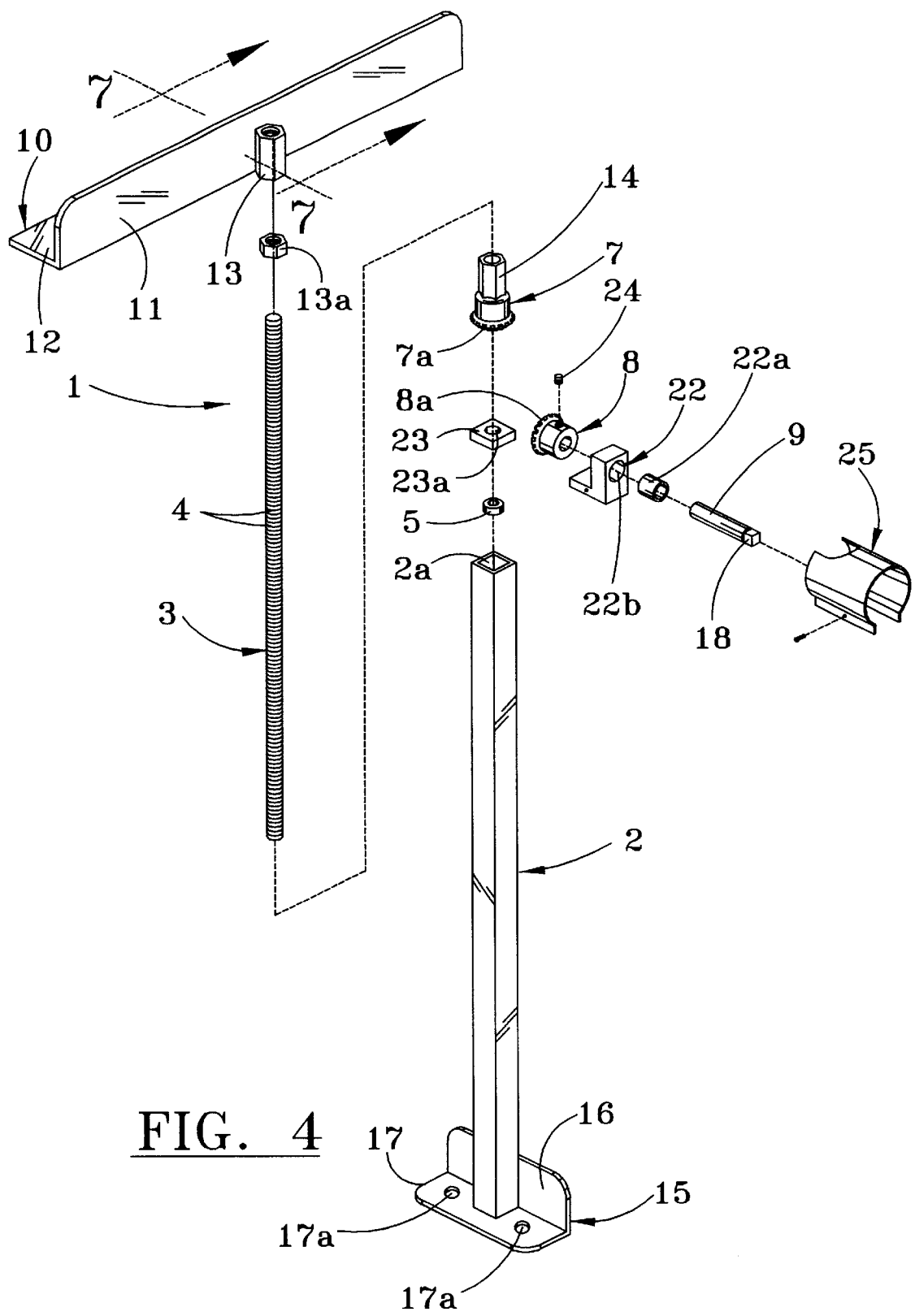
FIG. 4 is an exploded view of the heat exchanger housing support illustrated in FIG. 1, with the top bracket rotated 180 degrees to illustrate a preferred top nut configuration.

Referring initially to FIGS. 1, 2, 4 and 5 of the drawings, the heat exchanger housing support of this invention is generally illustrated by reference numeral 1. The heat exchanger housing support 1 is characterized by an upward-standing, elongated support leg 2, having a longitudinal leg cavity 2a of typically square cross-section, as illustrated in FIG. 4, and stabilized at the bottom end by means of an L-shaped bottom bracket 15. The bottom bracket 15 is typically characterized by a vertical bottom bracket flange 16 and a horizontal bottom bracket flange 17, which are welded or otherwise attached to the bottom end of the support leg 2, as illustrated in FIGS. 1, 3 and 4. The bottom bracket flange 17 may be provided with anchor fastener openings 17a. The bottom end of an elongated threaded rod 3, having rod threads 4, as illustrated in FIG. 4, is inserted in the top of the leg cavity 2a of the support leg 2 and extends through the mount opening 23a of a bracket mount 23, which is fitted in the top of the support leg 2. The bracket mount 23 is typically welded or otherwise attached to the top end of the support leg 2 in the leg cavity 2a and a rod spacer 5, typically having a square cross-section, is typically threaded or inserted on the bottom end of the threaded rod 3, to stabilize the threaded rod 3 for vertical movement only in the leg cavity 2a of the support leg 2, as illustrated in FIG. 5 and hereinafter further described. As further illustrated in FIG. 5, the rod spacer 5 is typically welded by means of a spacer weld 6 to the bottom end of the threaded rod 3, to prevent the threaded rod 3 from rotating in the rod spacer 5 and inside the leg cavity 2a of the support leg 3, as hereinafter described.

As illustrated in FIGS. 2, 4, 5 and 6 of the drawings, a side bevel gear 8, having bevel gear teeth 8a, is mounted on the top end of the support leg 2 at the bracket mount 23, by means of an L-shaped gear bracket 22. An adjusting nut 14 is threaded on the threaded rod 3 and is located immediately above and seats on a top bevel gear 7, having top bevel gear teeth 7a, that mesh with the side bevel gear teeth 8a of the side bevel gear 8, to facilitate rotation of the adjusting nut 14 by use of a wrench (FIG. 6) on the side bevel gear shaft 9 and raising and lowering the threaded rod 3 with respect to the support leg 2. The side bevel gear shaft 9 is rotatably mounted in a bracket bushing 22a, seated in a bushing seat 22b, located in the side bevel gear bracket 22, as further illustrated in FIG. 4. A set screw 24 serves to removably mount the side bevel gear 8 on the side bevel gear shaft 9. In this regard, in a most preferred embodiment of the invention, the support leg 2 is characterized by square tubing as illustrated, and the sliding rod spacer 5 (FIG. 5) is also round, such that rotatable pressure applied to the adjusting nut 14 by operation of the side bevel gear 8 and the meshing top bevel gear 7 will allow the threaded rod 3 and the rod spacer 5 to both linearly traverse the leg cavity 2a of the support leg 2 and rotate therein, without removal of the threaded rod 3 from within the leg cavity 2a or the rod spacer 5. Rotation of the threaded rod 3 and the rod spacer 5 allows ease of adjustment of the engaging elements of the heat exchanging housing support 1, as hereinafter described.

As further illustrated in FIG. 4 of the drawings, the vertical top bracket flange 11 of a typically L-shaped top bracket 10 is attached to the top end of the threaded rod 3 by means of a top nut 13, which is typically welded or otherwise secured to the vertical top bracket flange 11. A horizontal top bracket flange 12 extends from the bottom edge of the vertical top bracket flange 11 for engaging a bottom edge of the heat exchanger housing 19, illustrated in phantom in FIG. 3, and a jam nut 13a is threaded on the threaded rod 3 and secures the top end of the threaded rod 3 tightly inside the top nut 13. Accordingly, in a preferred embodiment of the invention the top end of the threaded rod 3 is threaded into the top nut 13 and the jam nut 13a to facilitate adjustment and locking of the top bracket 10 in a selected position and to allow removal of the top bracket 10 from the threaded rod 3, reversing the position of the top bracket 10 and exposing the opposite side of the horizontal top bracket flange 12 upwardly in a reversed position from that illustrated in FIGS. 1–3, for alternative lifting and supporting purposes. As further illustrated in FIG. 3, the heat exchanger housing 19 (illustrated in phantom) is typically seated on a fan housing 21 (also illustrated in phantom) and supports ductwork 20, typically as further illustrated in phantom. As illustrated in FIGS. 1–4, a guard 25 may encircle the side bevel gear 8 and top bevel gear 7 for safety purposes and may be secured in place by a guard flange screw 25b, which tightens the parallel guard flanges 25a, extending from opposite bottom edges of the guard 25.

Referring again to FIGS. 3 and 6 of the drawings, it is frequently necessary to raise and lower a typically heavy heat exchanger housing 19 with respect to the supporting fan housing 21 for installation and/or maintenance purposes. Accordingly, under circumstances where this is necessary, the respective thin, horizontal top bracket flanges 12 of a pair of spaced-apart heat exchanger housing supports 1 are inserted by rotation with the threaded rod 3 beneath parallel bottom edges of the heat exchanger housing 19, between the heat exchanger housing 19 and the fan housing 21. As the support legs 2 are fitted against opposite sides of the fan housing 21, the vertical bottom bracket flange 16 of each bottom bracket 15 is also positioned against corresponding sides of the fan housing 21, while the companion horizontal bottom bracket flange 17 of each support 1 are seated on a supporting surface and typically extend outwardly of the respective sides of the fan housing 21.

Referring again to FIGS. 2, 3 and 6 of the drawings, it will be further appreciated that the side bevel gear teeth 8a of the side bevel gear 8 are meshed with the top bevel gear teeth 7a of the top bevel gear 7 and the side bevel gear shaft 9 receives a wrench 26, positioned on the wrench flats 18 of the side bevel gear shaft 9. Accordingly, since the adjusting nut 14 is threaded on the rod threads 4 of the threaded rod 3 in each of the heat exchanger housing supports 1, and is also attached to a top bevel gear 7 in each of the two heat exchanger housing supports 1 illustrated in FIG. 3, manipulation of each side bevel gear 8 by means of the wrench 26 allows easy, friction-reduced rotation of each top bevel gear 7 and adjusting nut 14 on the corresponding rod threads 4 of the threaded rods 3, to facilitate raising and lowering of each threaded rod 3 inside the corresponding leg cavity 2a of the support leg 2, as the rod spacer 5 slides therein. Furthermore, each rod spacer 5, which prevents lateral movement of the threaded rod 3 in the leg cavity 2a, is typically welded by means of the spacer weld 6, or threaded and tightened or otherwise attached to the bottom end of the threaded rod 3, to prevent the threaded rod 3 from exiting the leg cavity 2a when rotatable pressure is applied to the corresponding adjusting nut 14.

Referring again to FIG. 4 of the drawings, it will be appreciated that the position of the top bracket 10 on the top end of the threaded rod 3 can be reversed by loosening the jam nut 13a and unthreading the top nut 13 and the jam nut 13a and the top bracket 10 from the top end of the threaded rod 3 and reversing the top bracket 10, such that the bottom side of the horizontal top bracket flange 12 is facing upwardly, to facilitate supporting substantially any object or item, including the ductwork 20 or other element of the heating and air conditioning equipment, as well as other structures, such as vertically-operated garage doors, automobile transmissions and the like, in non-exclusive particular, as desired. Furthermore, it will also be appreciated by those skilled in the art that the support leg 2 can be of substantially any desired length and size, along with the threaded rod 3, to facilitate use of the heat exchanger housing support or supports 1 in any desired configuration with respect to a heat exchanger housing 19 or other equipment of any desired size, weight and configuration. Moreover, the bottom bracket 15 can be of any desired size and shape to facilitate stabilizing the support leg 2 and the threaded rod 3, as well as the top bracket 10 thereon, in position for lifting a desired item.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A heat exchanger housing support comprising a support leg for resting on a supporting surface; a first bevel gear rotatably provided on said support leg; a threaded rod extending into one end of said support leg; an adjusting nut threaded on said threaded rod; a second bevel gear provided on said adjusting nut, said second bevel gear meshing with said first bevel gear; and an engaging member provided on said threaded rod for engaging the heat exchanger housing and supporting the heat exchanger housing responsive to rotation of said second bevel gear for driving said first bevel gear and rotating said adjusting nut on said threaded rod.

2. The heat exchanger housing support of claim 1 comprising a bevel gear bracket positioned on said one end of said support leg and wherein said first bevel gear is mounted on said bevel gear bracket.

3. The heat exchanger housing support of claim 1 comprising a bevel gear bracket positioned on said one end of said support leg and wherein said first bevel gear is mounted on said bevel gear bracket and a bevel gear shaft journalled for rotation in said bevel gear bracket and carried by said second bevel gear for rotating said second bevel gear.

4. The heat exchanger housing support of claim 1 comprising a bottom bracket provided on the opposite end of said support leg from said one end for stabilizing said support leg on the supporting surface.

5. The heat exchanger housing support of claim 1 comprising a bevel gear bracket positioned on said one end of said support leg and wherein said first bevel gear is mounted on said bevel gear bracket and a bottom bracket provided on the opposite end of said support leg from said one end for stabilizing said support leg on the supporting surface.

6. The heat exchanger housing support of claim 5 comprising a bevel gear shaft journalled for rotation in said bevel gear bracket and carried by said second bevel gear for rotating said second bevel gear.

7. The heat exchanger housing support of claim 1 wherein said engaging member comprises a top bracket and comprising a top nut provided on said top bracket and wherein said top nut is threaded on said threaded rod for removably and adjustably mounting said top bracket on said threaded rod.

8. The heat exchanger housing support of claim 7 comprising a bevel gear bracket positioned on said one end of said support leg and wherein said first bevel gear is mounted on said bevel gear bracket.

9. The heat exchanger housing support of claim 7 comprising a jam nut provided on said threaded rod for seating against said top nut and selectively preventing rotation of said threaded rod in said top nut.

10. The heat exchanger housing support of claim 7 comprising a bottom bracket provided on the opposite end of said support leg from said one end for stabilizing said support leg on the supporting surface.

11. The heat exchanger housing support of claim 10 comprising a bevel gear bracket positioned on said one end of said support leg and wherein said first bevel gear is mounted on said bevel gear bracket and a jam nut provided on said threaded rod for seating against said top nut and selectively preventing rotation of said threaded rod in said top nut.

12. The heat exchanger housing support of claim 11 comprising a bevel gear shaft journalled for rotation in said bevel gear bracket and carried by said second bevel gear for rotating said second bevel gear.

13. A heat exchanger housing support comprising an elongated support leg having one end adapted for resting on a supporting surface and a leg opening longitudinally extending into at least one end thereof; a first bevel gear rotatably mounted on said one end of said support leg; a threaded rod projecting into said leg opening; an adjusting nut threaded on said threaded rod and a second bevel gear mounted on said adjusting nut for meshing with said first bevel gear; and a housing support engaging member provided on said threaded rod for engaging the heat exchanger housing and raising and lowering the heat exchanger housing responsive to rotation of said second bevel gear and said first bevel gear and threadable rotation of said adjusting nut on said threaded rod.

14. The heat exchanger housing support of claim 13 comprising a bevel gear bracket provided on said one end of said support leg and wherein said first bevel gear is mounted for rotation on said bevel gear bracket.

15. The heat exchanger housing support of claim 13 comprising a bevel gear bracket provided on said one end of said support leg and wherein said first bevel gear is mounted for rotation on said bevel gear bracket and further comprising a bevel gear shaft journalled for rotation in said bracket and carried by said second bevel gear for rotating said first bevel gear and driving said second bevel gear.

16. The heat exchanger housing support of claim 13 comprising a bottom bracket provided on the opposite end of said support leg from said one end for stabilizing said support leg on the supporting surface.

17. The heat exchanger housing support of claim 16 comprising a bevel gear bracket provided on said one end of said support leg and wherein said first bevel gear is mounted for rotation on said bevel gear bracket.

18. The heat exchanger housing support of claim 13 comprising a bottom bracket provided on the opposite end of said support leg from said one end for stabilizing said support leg on a supporting surface; a bevel gear bracket positioned on said one end of said support leg and wherein said first bevel gear is mounted on said bevel gear bracket; and a bevel gear shaft journalled for rotation in said bevel gear bracket and carried by said second bevel gear, for rotating said first bevel gear and driving said second bevel gear.

19. The heat exchanger housing support of claim 18 wherein said housing support engaging member comprises a generally L-shaped top bracket and comprising a top nut provided on said top bracket and wherein said top nut is threaded on said threaded rod for removably mounting said top bracket on said threaded rod.

20. A support for engaging a supporting surface and supporting a heat exchanger housing, comprising an elongated support leg having a substantially square cross-section and a leg opening longitudinally extending into at least one end thereof; a first bevel gear rotatably mounted on said one end of said support leg; a threaded rod having one end projecting into said leg opening; a rod spacer fixed to said one end of said threaded rod in said leg opening for stabilizing said threaded rod in said leg opening; an adjusting nut threaded on said threaded rod at said one end of said support leg and a second bevel gear fixedly carried by said adjusting nut and meshing with said first bevel gear; a bottom bracket provided on the opposite end of said support leg from said one end for stabilizing said support leg on the supporting surface; and a generally L-shaped housing support engaging bracket provided on said threaded rod for engaging the heat exchanger housing and raising and lowering said threaded rod and the heat exchanger housing responsive to rotation of said first bevel gear, said second bevel gear and said adjusting nut on said threaded rod.

* * * * *